S. S. GIBBLE.
Insect Trap.
No. 234,976.  Patented Nov. 30, 1880.
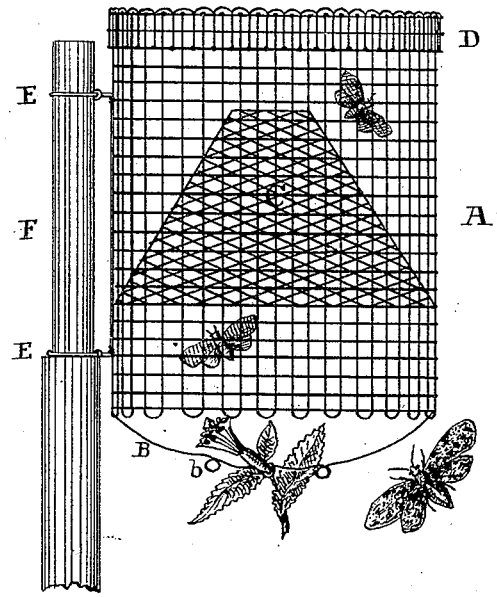
WITNESSES·
INVENTOR·

UNITED STATES PATENT OFFICE.

SAMUEL S. GIBBLE, OF MOUNT JOY, PENNSYLVANIA.

INSECT-TRAP.

SPECIFICATION forming part of Letters Patent No. 234,976, dated November 30, 1880.

Application filed February 26, 1880.

*To all whom it may concern:*

Be it known that I, SAMUEL S. GIBBLE, of Mount Joy, in the county of Lancaster and State of Pennsylvania, have invented certain Improvements in a Trap for the Moth of the Tobacco-Worm, of which the following is a specification.

The object of this invention is to protect tobacco-planters from the pest of the so-called "tobacco-worms" (known as the larvæ of several species of *Lepidoptera* of the sphinx family) by capturing the parent moth prior to laying her eggs upon the plants, from which the worm is hatched.
My invention relates to a wire trap for catching and imprisoning such moths; and it consists in providing it with eyes or rigidly-attached loops to serve as a means for supporting it upon a staff or pole, and with a looped pendent wire for suspending the bait beneath the open bottom of the trap, as hereinafter described and claimed.

The accompanying drawing will illustrate the construction of the trap, and a brief explanation of the letters of reference marked thereon enable those skilled in the art to make and use the same, in which A represents a wire sieve-like cylinder open at both ends—say ten inches in diameter and twelve or thirteen inches long. Starting, say, three inches from the bottom, a conic wire cylinder, C, is affixed to the full inner diameter of the cylinder A, narrowing upward to a ring or open mouth, say three inches in diameter, opening, say, three or four inches beneath the top, which is covered by a wire cap, D. To one side of the cylinder A a stout wire from within is turned outward, and formed at each end into an eye or ring, E, by which the trap is supported upon a shouldered stick, F, as shown. The bait-wire B has a series of loops, *b*, to receive the stems of flowers suspended externally and below the mouth of the trap or cylinders A C. Other flowers are set in the meshes of the conic portion C to decoy the insect upward, and, finally, through the open cone, seeking escape through the top or sides of the cylinder, where they are held captive, as experience for a season has amply proved.
The "potato-worm," so called, is the larva of the hawk-moth or sphinx, a group of *Lepidoptera*, that escape from their chrysalides in the soil where they were lodged during the winter, and come forth and take the wing in early summer. In this state they are harmless, as their suctorial apparatus only serves them to regale themselves on the nectar in the cups of flowers; but they soon pair and deposit their eggs upon plants suitable to nourish the young brood of caterpillars that hatch therefrom, and as one of the most destructive to the young tobacco-plants is our common five-spotted sphinx, (the *Sphinx quinquemaculatus*,) and these especially, as well as others, are very partial to the flowers of the thorn-apple, (the *Datura stramonium*,) vulgarly called "jimson weed," from "Jamestown weed," as originally named, I have discovered that by securing a few fresh flowers to the wire loops externally, and several within the cone near its mouth, and setting the trap on its pole near the tobacco-patch, or elsewhere out of doors, from near sunset till next morning, often as many as ten to sixteen of these moths will be caught in the trap, most of them being females, with each, perhaps, thousands of eggs.

I am aware that the wild phlox, honeysuckle, and other flowers will answer for a decoy for different species, so that it is well to bait the trap with different kinds of flowers frequented by them.

I am aware wire fly-traps have been provided with inner truncated cones, and I do not claim such combination of parts.

I am aware that wire fly-traps have been provided with a bail for use in lifting and carrying them, and with a bottom adapted to hold bait. My invention does not pertain to such construction.

What I claim is—

1. The wire trap A C D, having the laterally-projecting rigid rings or loops E E, for attaching the trap to a pole or staff, as shown and described.

2. The combination, with the bottomless wire body A, having cone C, of the bait-holding wire B, which is provided with a loop, and attached to opposite sides of portion A, and pendent beneath the latter, as shown and described.

SAMUEL S. GIBBLE.

Witnesses:
F. A. RICKER,
EMANUEL EBY.